United States Patent [19]

Branlard et al.

[11] Patent Number: 5,053,468

[45] Date of Patent: Oct. 1, 1991

[54] POLYMERIZATION OF CHLOROPRENE WITH TWO CHAIN TRANSFER AGENTS

[75] Inventors: Paul Branlard, Grenoble; Francois Sauterey, par Vis, both of France

[73] Assignee: Distugil, Neuilly/Sur/Seine, France

[21] Appl. No.: 617,256

[22] Filed: Nov. 21, 1990

Related U.S. Application Data

[63] Continuation of Ser. No. 282,568, Dec. 12, 1988, abandoned, which is a continuation of Ser. No. 53,478, May 26, 1987, abandoned, which is a continuation of Ser. No. 877,008, Jun. 20, 1986, abandoned, which is a continuation of Ser. No. 683,568, Dec. 19, 1984, abandoned.

[30] Foreign Application Priority Data

Dec. 20, 1983 [FR] France ................................ 83 20342

[51] Int. Cl.$^5$ ............................. C08F 2/38; C08F 2/24
[52] U.S. Cl. ..................................... 526/206; 526/220; 526/224
[58] Field of Search ........................ 526/206, 220, 224

[56] References Cited

U.S. PATENT DOCUMENTS

| | | | |
|---|---|---|---|
| 3,775,390 | 11/1973 | Khan | 526/224 |
| 3,932,355 | 1/1976 | Barney | 526/295 |
| 3,984,609 | 10/1976 | Branlard | 526/295 |

*Primary Examiner*—Christopher Henderson
*Attorney, Agent, or Firm*—Burns, Doane, Swecker & Mathis

[57] ABSTRACT

A polychloroprene of sol type, the latices and solutions of which are gel free, exhibit improved rheological and other properties and are useful in the formulation of adhesive compositions, is readily prepared by polymerizing chloroprene in aqueous emulsion in the presence of X and Y chain transfer agents, said X chain transfer agent being present upon initiation of the polymerization and having a relative reaction velocity greater than that of chloroprene, and said Y chain transfer agent being incrementally or continuously added to the polymerization reaction medium over the course of the polymerization reaction and having a relative reaction velocity essentially the same as that of chloroprene.

22 Claims, No Drawings

POLYMERIZATION OF CHLOROPRENE WITH TWO CHAIN TRANSFER AGENTS

This application is a continuation of application Ser. No. 282,568, filed Dec. 12, 1988 now abandoned which is a continuation of application Ser. No. 053,478, filed May 26, 1987, now abandoned, which is a continuation of application Ser. No. 877,008, filed June 20, 1986, now abandoned, which is a continuation of application Ser. No. 683,568, filed Dec. 19, 1984, now abandoned.

BACKGROUND OF THE INVENTION

1. Field of the Invention

The present invention relates to the polymerization of chloroprene, to the polychloroprenes obtained thereby and to the use thereof, particularly in adhesive compositions. More especially, the invention relates to the polymerization of chloroprene in aqueous emulsion, in the presence of certain chain transfer agents.

2. Description of the Prior Art

The polychloroprenes are today widely used in adhesive compositions, both in the latex state and in solution in a solvent. For such use, polymers of "sol" type are employed, namely, polymers which are soluble in organic solvents, whose viscosities may differ. However, in order to obtain adhesives which are characterized by high strengths of cohesion, high viscosities are preferred.

In most cases, for use in adhesive applications it is necessary to subject the polymer to mastication before it is placed in solution, the purpose of the mastication being to breakup the cross-linked or branched long chains which are present in the polymer and which are responsible for the elastic behavior of the product. This operation is relatively expensive. It was therefore of interest to develop a method of polymerization which makes it possible to directly obtain a rubber having the rheological properties of a standard kneaded product.

Another important standard of quality for a polychloroprene is its resistance to aging. In general, the viscosity thereof has a tendency to increase upon storage. This phenomenon, which is due to a cross-linking which is either faster or slower depending upon operating conditions, is known as aging of the polymer. The increase in viscosity may or may not be accompanied by the appearance of a gel, which results in a partial insolubilizing of the polychloroprene in preparations for adhesives and a substantial modification of the physical and rheological properties of the polymers.

It too is known that the resin acids which may be present in the polymerization system protect the latex from aging. However, these resin acids are responsible for the phenomenon of phase-separation which is observed, within a shorter or longer period of time, in adhesive mixtures having solvents comprising magnesia and phenolic resins. One way of avoiding this phenomenon consists of polymerizing the chloroprene in the presence of reduced amounts of rosin and of a moderate amount of fatty acids (see French Patent No. 2,164,095). However, under these conditions, particularly when thiurams are added upon completion of the polymerization, increased natural aging of the polychloroprene is noted.

A conventional technique which makes it possible to obtain polychloroprenes of sol type consists of polymerizing chloroprene in the presence of a chain transfer agent. The viscosity obtained depends upon the type and concentration of the chain transfer agent, as well as upon the degree of conversion of the monomer into polymer For economic reasons it is desirable that the conversion rate be as high as possible, preferably greater than 70%.

By using only a minor amount of chain transfer agent such as n-dodecylmercaptan (n-DDM), introduced in its entirety at the beginning of the polymerization, it is possible to obtain polychloroprenes of high viscosity. However, the polymer which results therefrom is of a partially cross-linked structure, which results in a "gel" phase which renders the polymer partially insoluble in its own solvents The gel appears faster the higher the final conversion.

One method which is well known in emulsion polymerization for reducing the average molecular weight of a polymer for a given conversion consists of adding the modifying agent incrementally or continuously throughout the polymerization. An improvement in this general technique has been proposed in German Patent No. 2,060,659. However, it is not possible by this technique to avoid the total absence of gel in polychloroprene latex of high solution viscosity, particularly after aging of the latex and when the conversion rate is greater than about 70%.

By "high viscosity" as utilized herein, there are intended Brookfield viscosities at least equal to about 2500 mPa.s, measured at 23° C. in a 10% solution in toluene.

SUMMARY OF THE INVENTION

Accordingly, a major object of the present invention is the provision of an improved process for the polymerization of chloroprene, which improved process enables the regulation of the viscosity of the product polychloroprene over wide ranges without the formation of gel, while at the same time enabling the polymerization to be carried out to an industrially acceptable degree of conversion.

Another object of the invention is the provision of a "sol" polychloroprene of high viscosity which is free of gel or long cross-linked chains which might lead to the formation of gel.

Still another object of the invention is the provision of a polychloroprene for use in adhesive mixtures with solvent having a high viscosity, good natural aging, improved rheological behavior and which does not exhibit the phase separation phenomenon.

Briefly, in accordance with the present invention it has now been found that by combining and coordinating the action of two chain transfer agents having different reactivities it is possible to obtain a polymer of high viscosity in solution without formation of gel, together with improved rheological behavior, as compared with the prior art use of a single chain transfer agent, and for the same degree of conversion of monomer into polymer.

The activity of a chain transfer agent can be measured by its relative reaction velocity, as compared to the polymerization velocity of the monomer or monomers to be polymerized.

DETAILED DESCRIPTION OF THE INVENTION

More particularly in accordance with the present invention, chloroprene, or a mixture of chloroprene and of up to 20% by weight of a comonomer copolymerizable therewith, is polymerized in alkaline aqueous emulsion in the presence of a chain transfer agent, characterized in that, at the beginning of the polymerization reaction a chain transfer agent is added to the polymerization medium which has a relative reaction velocity which is greater than that of chloroprene, and that incrementally or continuously throughout the course of the polymerization, another transfer agent is added thereto whose relative reaction velocity is essentially equal to that of the chloroprene.

The combination of these two transfer agents in accordance with the invention has the result of preventing, throughout the polymerization, the formation of masses of excessively high molecular weight and therefore excessive branching. This result could not be obtained by the use of a single transfer agent according to the prior art.

The chain transfer agents which are used in accordance with the invention are advantageously selected from among the molecular-weight regulators known to the art for the polymerization of chloroprene, after having determined the reactivity thereof.

Among the chain transfer agents having a high relative reaction velocity as compared with that of chloroprene, hereinafter designated the "X transfer agents", preferred are the compounds of the formula $R\text{-}CI_3$ in which R represents hydrogen or an alkyl group containing from 1 to 3 carbon atoms. Iodoform is the more preferred.

Among the chain transfer agents having a relative reaction velocity essentially equal to that of chloroprene, hereinafter designated the "Y transfer agents", representative are the straight or branched chain aliphatic mercaptans containing from 8 to 18 carbon atoms, such as n-octylmercaptan, n-dodecylmercaptan, and isododecylmercaptan. n-Dodecylmercaptan is preferably used because of its ready commercial availability. Aromatic disulfides, such as benzanilide disulfide, can also be used.

The X and Y transfer agents can be introduced into the polymerization reaction medium in the form of a solution, emulsion, or in pure state.

The degree of conversion of the monomer or monomers, the quantities of the chain transfer agents and the polymerization temperature are important parameters of the process according to the invention.

The amount of X transfer agent which is added upon initiation of the polymerization advantageously ranges from 50 to 700 ppm, expressed by weight thereof (e.g., the weight of iodoform) relative to the weight of chloroprene charged.

The total amount of Y transfer agent is a function of the degree of conversion of the chloroprene and the polymerization temperature. In general, it ranges from 10 to 70 ppm, expressed as the weight of mercaptan, in this case n-dodecylmercaptan (n-DDM), per percent conversion of the monomer utilizing a constant rate of introduction of the Y transfer agent. The polymerization temperature $\theta$ advantageously ranges from 5° to 50° C. In this range, and provided that the concentrations of X and Y are within the ranges noted hereinabove, the minimum total amount of Y agent is calculated by the equation: $Y$ (ppm/% conversion) $> 14 + 1.9\theta - 0.08 X - 0.0014 \times \theta$.

It may be advantageous to introduce the Y transfer agent at a variable, generally increasing rate. The increase in the rate of introduction as a function of the conversion of the monomer may be linear or non-linear above a certain rate of conversion of the monomer such as to modify the molecular weight distribution of the polymer. In this case, the total amount of Y can range from 10 to 300 ppm, expressed in weight of n-DDM per percent conversion of the monomer.

If one uses X and Y transfer agents other than iodoform and n-DDM, the above amounts are calculated by a simple molecular weight ratio.

The Y transfer agent can be added incrementally or continuously. Whatever the method selected, it must be such that the quantity introduced is at all times within the limits indicated above as a function of the degree of conversion. By proceeding in this fashion, the final conversion of the monomer into polymer may reach 90% using low polymerization temperatures and 80% for higher temperatures.

In another embodiment of the process of the invention, it is possible to add, during the polymerization, in addition to the Y transfer agent, preferably after 50% conversion of the chloroprene, a transfer agent whose relative reaction velocity is greater than that of chloroprene. This agent may be identical to or different from the transfer agent introduced upon the initiation of the polymerization.

Except for the improvement consistent with the present invention, the polymerization is carried out by the known techniques for polymerization in alkaline emulsion of chloroprene in the presence of a chain transfer agent.

The chloroprene can of course be copolymerized with another comonomer having at least one ethylenic double bond.

Among such comonomers which can be copolymerized with chloroprene, exemplary are the vinyl aromatic compounds, such as styrene, vinyl toluenes and vinyl naphthalenes, the acrylic/methacrylic acids as well as the ester and nitrile derivatives thereof, such as ethyl acrylate, methyl methacrylate and acrylonitrile, the aliphatic conjugated diolefins, such as 1,3-butadiene, isoprene, 1-chlorobutadiene, 2,3-dichlorobutadiene, the vinyl ethers and ketones, such as methyl vinyl ether, vinyl acetate and methyl vinyl ketone.

The polymerization is carried out in aqueous emulsion using conventional free-radical generator catalysts. Especially representative thereof are the peroxide compounds, such as the alkali metal or ammonium persulfates, hydrogen peroxide, cumene peroxide, benzoyl peroxide as well as the ferricyanides of alkali metals and ammonium.

The concentration of monomer present in the aqueous emulsion is not critical; it typically ranges from 30% to 60% of the total weight of the emulsion.

The polymerization is advantageously carried out in an inert atmosphere in the absence of oxygen.

The pH of the emulsion advantageously ranges from 11 to 13.

Any conventional emulsifying and protective colloid agent can be used to prepare the emulsion of the chloroprene. Among said agents, representative are the water-soluble salts, and particularly the sodium, potassium or ammonium salts, of the following compounds: long chain fatty acids, rosin or derivatives of pine, wood or tall oil rosin, partially polymerized, isomerized or disproportionated rosin; fatty alcohol sulfates, alkyl sulfates and alkyl sulfonates; the alkaline salts of alkyl aryl sulfonic acids as well as condensation products of formol with aryl sulfonic acids such as naphthene sulfonic acid, and condensates of ethylene oxide and phenols.

For the preparation of polychloroprene suited for adhesive use with solvents, particularly preferred is an emulsifying system whose composition by weight, relative to the chloroprene, is 1.8 to 3% resin derivatives and 0.1 to 1% saturated or unsaturated fatty acid (French Patent No. 2,164,095 and U.S. Pat. No. 3,872,043).

The polymerization can be stopped or terminated at any instant by the addition of conventional polymerization inhibitors thereto, the degree of conversion being the highest possible and preferably at least equal to 70%.

At the time of terminating the polymerization, conventional antioxidant compounds such as di-tert-butyl paracresol, 2,2'-methylene-bis-(6-t-butyl-p-cresol), 2,2'-thiobis-(4,6-di-t-butyl phenol), and 2,6-di-t-butyl-4-phenylphenol can be added to the latex.

The polychloroprene can be isolated from the latex in any known manner, for example, by coagulation on a cold drum or steam-heated drum, washing and drying.

The process of the invention makes it possible to obtain, with a high degree of conversion, sol polychloroprenes having high cohesive strengths and exceptionally satisfactory rheological behavior. They have good resistance to aging even in the absence of aging inhibiting agents. They are particularly suitable for use as base polymer in the preparation of glues and adhesives, without having to first subject same to preliminary mastication.

In order to further illustrate the present invention and the advantages thereof, the following specific examples are given, it being understood that same are intended only as illustrative and in nowise limitative.

EXAMPLE I

Into a polymerization reaction vessel were introduced:

| | | |
|---|---|---|
| (i) | Chloroprene | 100 parts by weight |
| (ii) | Water | 100 parts by weight |
| (iii) | Resinic acid: Disproportionated rosin (marketed under the trademark Phèdre V by Passicos Company) | 2 parts by weight |
| (iv) | Sodium oleate | 0.4 parts by weight |
| (v) | Caustic soda (100%) | 0.46 parts by weight |
| (vi) | Sodium salt of methylene-bis-alkylnaphthalene sulfonic acids Distabex LS (marketed under the trademark by Cie Francaise des Matières Colorantes) | 0.875 parts by weight |
| (vii) | Iodoform | 0.0275 parts by weight |
| | together with an initial catalyst composed of: | |
| (A) | Ferrous sulfate (7 H$_2$O) | 0.00384 parts by weight |
| | Disodium salt of ethylene diamine tetraacetic acid (marketed under the trademark Masquol B by Société PROTEX) | 0.00577 parts by weight |
| | Caustic soda | 0.00124 parts by weight |
| | Water | 1.026 parts by weight |
| (B) | Sodium dithionite | 0.0294 parts by weight |
| | Water | 0.588 parts by weight |

The polymerization was carried out for 10 hours at +10° C., while maintaining a suitable flowstream of aqueous solution of ammonium persulfate.

Immediately after commencing the polymerization, 20 ppm of n-dodecylmercaptan per percent of conversion of monomer into polymer were continuously added.

The polymerization was terminated at a conversion of 80% by the mixture:

| | |
|---|---|
| (1) Chloroprene | 0.8 parts by weight |
| (2) Sodium lauryl sulfate | 0.02 parts by weight |
| (3) Phenothiazine | 0.01 parts by weight |
| (4) Water | 2.93 parts by weight |

Finally, 0.4 parts of ditertiobutyl paracresol in solution in chloroprene (2.93 parts) was added to the resulting latex.

The steam distillation and isolation of the latex were next carried out according to techniques typically employed in the polychloroprene art. In particular, the isolation was effected by coagulation of the latex adjusted to a pH of 6.5 on a drum cooled to −20° C. The obtained film was washed and then dried.

The following measurements were made on the product polychloroprene; the viscosity, rheological behavior and presence of gel:

Viscosity: Brookfield, model LVT +23° C., 10% solution by weight in toluene

Rheological behavior: Measurement of the Weissenberg effect ("A Continuum Theory of Rheological Phenomena", K. Weissenberg, *Nature*, 159, pages 310–311, Mar. 1, 1947).

The polychloroprene was dissolved in toluene such as to provide a viscosity of 5000 mPa.s.

A cylindrical rod, graduated in millimeters, one of the ends of which was terminated by a cone, was immersed in the liquid such that the level of the liquid was at the "O" marking. Upon rotation of the rod (300 rpm), the viscoelastic liquid rose along the rod. The height reached, expressed in mm, after 30 seconds of rotation, known as the "Weissenberg rise," was proportional to the force perpendicular to the shear which was exercised (normal force).

Temperature of the test: 23° C.

The Weissenberg rise characterizes the elasticity of the polymer solution and its suitability for brushability such that the lower it is the more the rheological behavior is improved.

Presence of Gel:

50 mg of the polychloroprene were dissolved in 20 ml of tetrahydrofuran, with agitation for two hours by means of a vibratory agitator.

The solution was filtered on an 0.45 μ Teflon filter.

If the solution passed completely through the filter, the polychloroprene was considered to be free of gel (−).

The polychloroprene obtained in accordance with this example had a viscosity of 4500 mPa.s, and a Weissenberg effect of 40 mm. No gel was detected in the initial polymer nor after aging for 3 days at 70° C.

EXAMPLES 2 TO 16

The polymerization was carried out in the same manner as in Example 1, but varying the polymerization temperature and the amounts of iodoform and n-dodecylmercaptan (n-DDM).

The concentrations of iodoform are expressed as parts by weight of iodoform, relative to the weight of the chloroprene charged.

The concentrations of n-DDM are expressed as parts by weight of n-dodecylmercaptan relative to the weight of chloroprene charged per percent conversion.

The results are reported in the Table I which follows.

Comparative Examples A to G

The polymerization was carried out in the same manner as in Example I, except that the iodoform was eliminated and in its place varying amounts of n-DDM were introduced into the initial charge. In these examples, no further addition of n-DDM was effected over the course of the reaction. The polymerization was terminated when the rate of conversion reached 80%.

The results are reported in the Table II which follows.

For viscosities equal to or greater than 1100 mPa.s, there were noted the presence of small amounts of gel (+) in the initial polymer, poor aging of the polymer and a large Weissenberg effect.

Comparative Examples H to N

The polymerization was carried out according to Example I, but the iodoform was replaced by varying amounts of n-DDM and additional amounts of n-DDM were continuously added over the course of the polymerization. The polymerization was terminated when the rate of conversion reached 80%.

The results are reported in the Table III which follows.

An improvement was noted as compared with tests A to G for a smaller initial concentration of n-DDM. However, the gel rapidly appeared over the course of aging in the case of a viscosity of about 2000 mPa.s (test J).

EXAMPLE 17

The polymerization was carried out in the same manner as in Example I, but the concentration of n-DDM was varied as a function of the conversion of the monomer in accordance with the following scheme:

| % Conversion of the chloroprene | n-DDM ppm/% conversion |
|---|---|
| Between 0 and 40 | 25 |
| 40 and 50 | 30 |
| 50 and 60 | 35 |
| 60 and 65 | 45 |
| 65 and 70 | 60 |
| 70 and 75 | 100 |
| 75 and 80 | 140 |
| 80 and 85 | 200 |

The polymerization was terminated at 85% conversion.

The obtained polychloroprene had a viscosity of 800 mPa.s (10% solution in toluene), and a Weissenberg effect of 10 mm. The initial polymer and the polymer after aging for 3 days at 70° C. were free of gel.

EXAMPLE 18

The polymerization was carried out in the same manner as in Example I, with the exception that the polymerization temperature was 30° C. and the amount of initial iodoform was 0.0400 parts by weight. The concentration of n-DDM was varied as a function of the conversion in accordance with the following scheme:

| % conversion of the chloroprene | n-DDM ppm/% conversion |
|---|---|
| Between 0 and 40 | 20 |
| 40 and 50 | 30 |
| 50 and 60 | 50 |
| 60 and 65 | 80 |
| 65 and 70 | 130 |
| 70 and 75 | 200 |
| 75 and 80 | 300 |

The polymerization was terminated at 80% conversion.

The viscosity of the obtained polychloroprene was 950 mPa.s and its Weissenberg effect was 25 mm.

No gel was detected in the initial polymer or after aging for 3 days at 70° C.

EXAMPLE 19

The polymerization was carried out in a manner identical to Example I at a temperature of 10° C.

The amount of iodoform initially charged was 0.0250 parts by weight.

After commencing the polymerization, n-DDM was continuously added and then a mixture of n-DDM and iodoform in accordance with the following scheme:

| % Conversion of chloroprene | Transfer agents ppm/% conversion | |
|---|---|---|
| | n-DDM | Iodoform |
| Between 0 and 50 | 25 | 0 |
| 50 and 60 | 25 | 10 |
| 60 and 70 | 25 | 20 |
| 70 and 80 | 25 | 30 |
| 80 and 85 | 25 | 40 |

The polymerization was terminated at 85% conversion.

| Viscosity of the polychloroprene | 670 mPa.s |
|---|---|
| Weissenberg effect | 10 |
| Gel | none |

TABLE I

| Example | $\theta$ (°C.) | Conversion (C%) | Iodoform concentration (ppm) (X) | n-DDM concentration (ppm/% conversion) (Y) | Viscosity mPa.s | Weissenberg Effect for 5000 mPa.s (mm) | Presence of gel Initial/After 3 days at 70° C. |
|---|---|---|---|---|---|---|---|
| 1 | 10 | 80 | 275 | 20 | 4500 | 40 | — — |
| 2 | 10 | 80 | 50 | 30 | 3800 | 60 | — — |
| 3 | 10 | 80 | 50 | 40 | 1600 | 30 | — — |
| 4 | 10 | 80 | 100 | 30 | 3750 | 35 | — — |
| 5 | 10 | 80 | 100 | 40 | 1000 | 20 | — — |
| 6 | 10 | 80 | 150 | 40 | 600 | 10 | — — |
| 7 | 10 | 80 | 200 | 30 | 1800 | 20 | — — |
| 8 | 10 | 80 | 300 | 20 | 2600 | 25 | — — |
| 9 | 30 | 80 | 200 | 55 | 1700 | 35 | — — |
| 10 | 30 | 80 | 250 | 45 | 2500 | 40 | — — |
| 11 | 45 | 80 | 500 | 50 | 450 | 30 | — — |

TABLE I-continued

| Example | θ (°C.) | Conversion (C%) | Iodoform concentration (ppm) (X) | n-DDM concentration (ppm/% conversion) (Y) | Viscosity mPa.s | Weissenberg Effect for 5000 mPa.s (mm) | Presence of gel Initial/After 3 days at 70° C. | |
|---|---|---|---|---|---|---|---|---|
| 12 | 45 | 80 | 350 | 65 | 900 | 45 | — | — |
| 13 | 45 | 80 | 400 | 50 | 1000 | 40 | — | — |
| 14 | 10 | 75 | 300 | 20 | 2500 | 20 | — | — |
| 15 | 10 | 70 | 300 | 20 | 2300 | 15 | — | — |
| 16 | 10 | 85 | 300 | 20 | 3900 | 45 | — | — |

TABLE II

The modifying agent, n-DDM, was introduced in its entirety prior to the polymerization.

| Example | θ (°C.) | n-DDM concentration (ppm) | Viscosity mPa.s | Weissenberg Effect for 5000 mPa.s (mm) | Presence of Gel Initial/After 3 days at 70° C. | |
|---|---|---|---|---|---|---|
| A | 10 | 1400 | 450 | 20 | — | — |
| B | 10 | 1100 | 1500 | 55 | (+) | + |
| C | 10 | 900 | 3900 | 70 | + | + |
| D | 25 | 1400 | 850 | 30 | — | — |
| E | 35 | 1450 | 1400 | 55 | (+) | + |
| F | 40 | 1350 | 1500 | 65 | + | + |
| G | 45 | 1800 | 1100 | 65 | (+) | + |

TABLE III

One part of the modifying agent, n-DDM, was introduced upon charging and the other part continuously during the polymerization.

| Example | θ (°C.) | n-DDM concentration Initial (ppm) | n-DDM concentration Continuous (ppm/% conversion) | Viscosity mPa.s | Weissenberg Effect for 5000 mPa.s (mm) | Presence of Gel Initial/After 3 days at 70° C. | |
|---|---|---|---|---|---|---|---|
| H | 10 | 400 | 30 | 500 | 20 | — | — |
| I | 10 | 650 | 14 | 1100 | 25 | — | — |
| J | 10 | 500 | 14 | 1850 | 45 | — | + |
| K | 10 | 130 | 30 | 4400 | 55 | (+) | + |
| L | 30 | 800 | 30 | 1500 | 45 | (+) | + |
| M | 40 | 1000 | 30 | 1200 | 50 | (+) | + |
| N | 34 | 1300 | 30 | 1650 | 60 | + | + |

While this invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of a sol polychloroprene, comprising polymerizing chloroprene in aqueous emulsion in the presence of X and Y chain transfer agents, said X chain transfer agent being present upon initiation of the polymerization and having a relative reaction velocity greater than that of chloroprene, and said Y chain transfer agent being incrementally or continuously added to the polymerization reaction medium over the course of the polymerization reaction and having a relative reaction velocity essentially the same as that of chloroprene.

2. The process as defined by claim 1, comprising copolymerizing chloroprene and up to 20% by weight of a comonomer copolymerizable therewith.

3. The process as defined by claim 1, comprising polymerizing chloroprene in alkaline aqueous emulsion.

4. The process as defined by claim 1, said X chain transfer agent comprising a compound of the formula $R-CI_3$ in which R is hydrogen or an alkyl radical having from 1 to 3 carbon atoms.

5. The process as defined by claim 4, said X chain transfer agent comprising iodoform.

6. The process as defined by claim 1, said Y chain transfer agent comprising a straight or branched chain alkyl mercaptan having from 8 to 18 carbon atoms or an aromatic disulfide.

7. The process as defined by claim 6, said Y chain transfer agent comprising n-dodecylmercaptan.

8. The process as defined by claim 6, said Y chain transfer agent comprising benzanilide disulfide.

9. The process as defined by claim 1, wherein the temperature of polymerization ranges from 5° to 50° C.

10. The process as defined by claim 1, comprising polymerizing chloroprene in the presence of 50 to 700 ppm, relative to the weight of chloroprene monomer, of iodoform as the X chain transfer agent, and 10 to 70 ppm, relative to the weight of chloroprene per percent conversion of monomer into polymer, of n-dodecylmercaptan as the Y chain transfer agent, said n-dodecylmercaptan being continuously added to the polymerization reaction medium at a constant rate of addition.

11. The process as defined by claim 1, comprising polymerizing chloroprene in the presence of 50 to 700 ppm, relative to the weight of chloroprene monomer, of iodoform as the X chain transfer agent, and 10 to 300 ppm, relative to the weight of chloroprene per percent conversion of monomer into polymer, of n-dodecylmercaptan as the Y chain transfer agent, said n-dodecylmercaptan being added to the polymerization reaction medium at a progressively increasing rate of addition.

12. The process as defined by claim 1, further comprising adding a chain transfer agent having a relative reaction velocity greater than that of chloroprene to the polymerization reaction medium over the course of the polymerization reaction, in addition to said Y chain transfer agent.

13. The process as defined by claim 1, wherein the total minimum amount of Y chain transfer agent added is determined by the equation: Y (ppm/% conversion)$> 14 + 1.9\theta - 0.08X - 0.0014 X \times \theta$, wherein X is the amount of X chain transfer agent and $\theta$ is the temperature of polymerization.

14. The process as defined by claim 1, wherein the polymerization reaction medium comprises a free-radical polymerization catalyst.

15. The process as defined by claim 1, carried out in an inert atmosphere.

16. The process as defined by claim 1, wherein the beginning aqueous emulsion comprises from 30 to 60% by weight of monomer.

17. The process as defined by claim 1, said aqueous emulsion having a pH ranging from 11 to 13.

18. The process as defined by claim 1, further comprising terminating the polymerization when the degree of monomer conversion has attained predetermined value.

19. The process as defined by claim 18, said predetermined value being at least 70%.

20. The process as defined by claim 1, further comprising separating the chloroprene polymer from the resulting latex thereof.

21. The process as defined by claim 18, further comprising adding an antioxidant to the resulting latex of chloroprene polymer.

22. The process as defined by claim 1, said aqueous emulsion comprising from 1.8 to 3% by weight of resin derivative and 0.1 to 1% by weight of saturated or unsaturated fatty acid, or alkaline salt or mixture thereof, based upon the weight of the chloroprene.

* * * * *